Sept. 10, 1957 G. L. HAMMON 2,805,871
DIFFERENTIAL DRY JOINT FOR FLUID MANIFOLD
Filed June 22, 1953 2 Sheets-Sheet 1

INVENTOR.
GEORGE L. HAMMON
BY
ATTORNEY

Sept. 10, 1957  G. L. HAMMON  2,805,871
DIFFERENTIAL DRY JOINT FOR FLUID MANIFOLD
Filed June 22, 1953  2 Sheets-Sheet 2
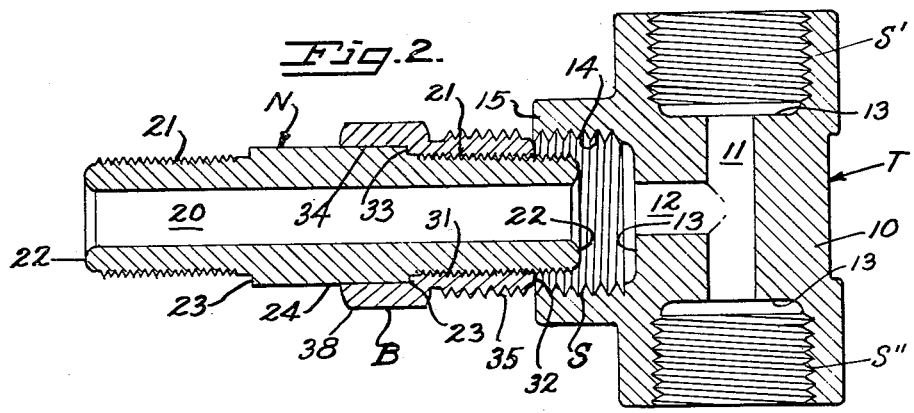
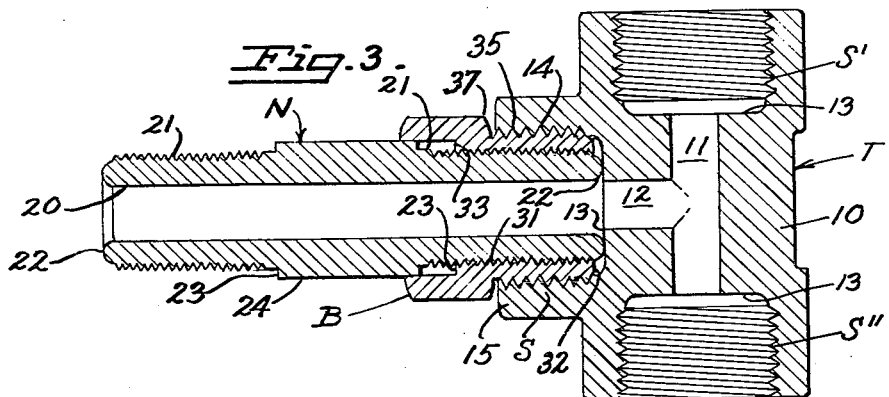
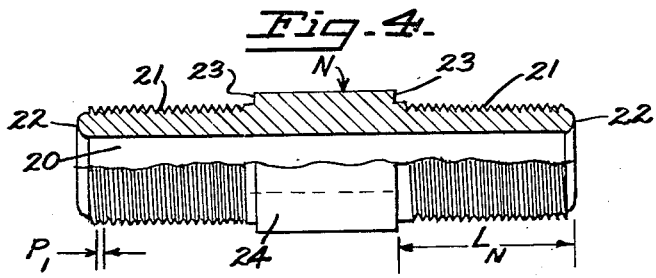
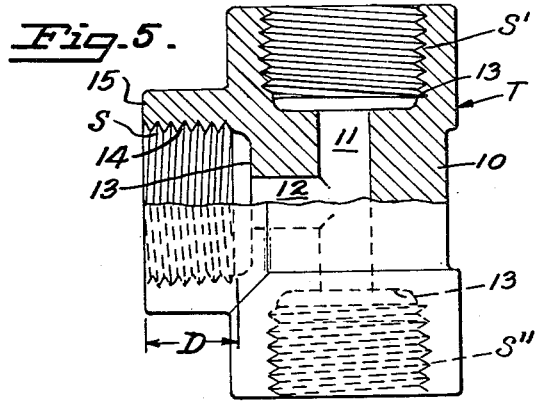
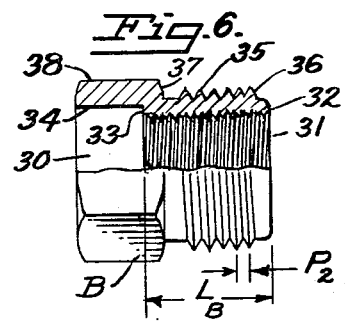
INVENTOR.
GEORGE L. HAMMON
BY
ATTORNEY

United States Patent Office 2,805,871
Patented Sept. 10, 1957

2,805,871

DIFFERENTIAL DRY JOINT FOR FLUID MANIFOLD

George L. Hammon, Oakland, Calif., assignor to National Welding Equipment Co., San Francisco, Calif., a corporation of California Application June 22, 1953, Serial No. 363,196

2 Claims. (Cl. 285—18)

This invention relates to improvements in manifolding and in particular to a differential dry joint for making a fluid-tight connection between two fluid conduits when assembling a manifold.

The invention may be used for joining a nipple to a pipe, a nipple to an elbow, a nipple to a valve housing, and so on. It solves the problem of securing a leak-tight joint without the use of silver solder, brazing, litharge and glycerin, or other sealing compounds, some of which cannot safely be used with inflammable gases.

The dry unsoldered joint of this invention is safe for use with highly inflammable gases, such as high pressure hydrogen, oxygen, or acetylene. Therefore, the invention is particularly useful in making up high pressure gas manifolds. For example, two or more high-pressure gas cylinders may be connected to a manifold, so that one or more cylinders can be removed and replaced without interrupting the flow of gas from other cylinders. Heretofore, these manifold systems have been assembled from conventional types of pipe fittings, which has required the sealing of each joint by litharge and glycerin or brazing or the like. These manifolds generally have had to be built individually to different specifications for each installation, and they have had to be absolutely leak-tight because of the very high pressures and explosiveness of the gases carried in them. Heretofore it has always been difficult to keep the pipe fittings tight because as more of such fittings were added on, it became difficult to obtain perfect alignment and in bending to obtain alignment, seals which had already been made were broken.

The practice in the compressed gas industry has been for these manifolds to be supplied to the customer by the same concern that supplied the gas cylinders. When one gas supplier lost its contract and another took over, the original supplier removed its manifold and, heretofore, has had to scrap it, because the soldering or the joint compounds used prevented reclamation and reuse of the fittings in making up other manifolds.

The succeeding gas supplier then built up another manifold to meet the customers' specifications. Due to the type of brazing or soldering that heretofore had to be used in obtaining leak-tight joints, the manifold could not be assembled at the place where it was to be used, because the brazing equipment was almost never available there. Consequently, the pipe fittings had to be put together at a factory and shipped assembled. Breakage of joints during shipment occurred frequently and often could not be repaired upon arrival. Also the bulkiness of an assembled manifold added greatly to the cost of shipment, as compared with the cost of shipping the individual pieces from which it was assembled.

The present invention makes it possible to construct any desired manifold or other type of assembly at the place of use, from T's, elbows, nipples, valves, and pigtails, made to match each other in conformity with the invention as later described. All these fittings may be threaded in the same direction. Each joint makes a perfect union and can be put together anywhere by an unskilled mechanic with no other tool than a simple wrench. Since the parts can be shipped unassembled, the expense of shipment is reduced, and the danger of breakage or leakage is greatly lessened. Since the parts can be easily taken apart, it is possible to reuse the parts and to enlarge a customer's manifold system with a minimum of effort and expense.

The invention accomplishes these results by making each connection from three special fittings: a socket, a nipple, and a bushing. The socket is usually in a T or elbow or similar fitting and has a usual pitch to its thread. The nipple is specially threaded with a thread having less pitch than the thread in the socket. The bushing is threaded on the outside at a pitch to match the socket threads and is threaded on the inside at a pitch to match the nipple threads. The bottom of the socket has a flat wall adapted to be engaged by the flat end of the nipple. In assembly the bushing is first threaded on the nipple and then is threaded into the socket. Since there are more threads per inch on the nipple than in the socket, the flat end of the nipple will be carried into a seal-tight engagement with the flat end wall of the socket by rotating only the bushing. This differential in threads is an important feature of the invention, for it makes it possible to obtain a tight joint by rotating only the bushing, leaving the nipple and socket stationary. The invention is best practiced by adhering to certain ranges of proportions.

Other objects and advantages of the invention will appear from the following illustrative description of a preferred example thereof, given in accordance with 35 U. S. C. 112.

In the drawings:

Fig. 2 is a view in elevation and in section showing the bushing threaded on the nipple and the bushing about to be inserted into the socket of a T member;

Fig. 3 is a view similar to Fig. 2 showing the completed joint or union;

Fig. 4 is a view in elevation and partly in section of the nipple used in the union of Figs. 2 and 3;

Fig. 5 is a view in elevation and partly in section of the T used in the union of Figs. 2 and 3, incorporating, in this instance, three sockets of the type used in this invention;

Fig. 6 is a view in elevation and partly in section of the bushing used in this invention.

Figure 1:
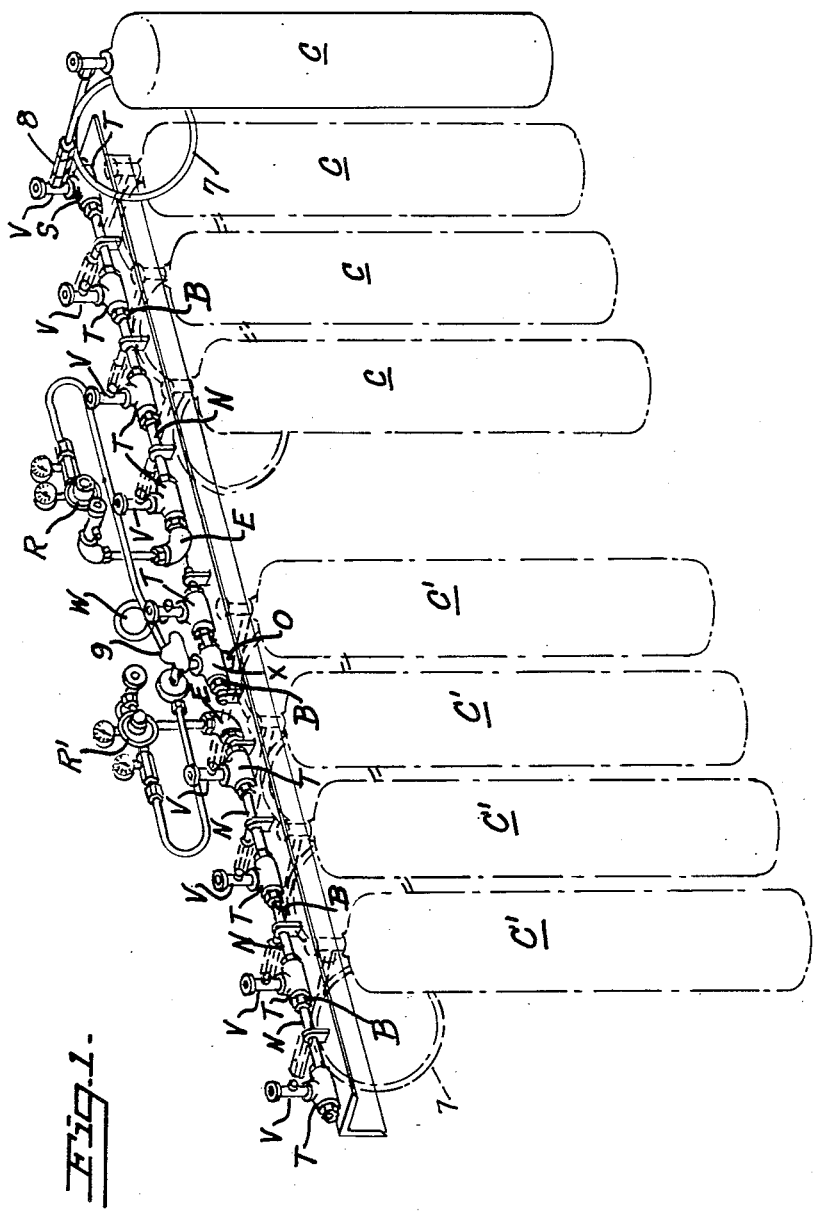
Fig. 1 is an isometric view of a manifold assembly employing the present invention, with all of the gas cylinders except one, being shown in phantom.

The manifold assembly shown in Fig. 1 includes eight cylinders C, C' suitable for storing gas under high pressure, disposed in two groups of four cylinders each. Each cylinder C, C' is connected by a pigtail 7 and check valve 8 to a cylinder valve V. The valve V is threaded in one socket S of a T T, and each group of four T's T leading from the valves V are joined in series by nipples N to form a manifold. According to the principles of this invention, each nipple N and each valve V is joined to a leg of the T T by a bushing B threaded around the nipple N and into a socket S. (In some cases the valve V may not require the use of the bushing.) Similarly the joints of this invention employing the intermediary bushing B are used in securing the elbows E to nipples N.

The gas from each section of the manifold is conducted to its regulator R or R' and the two regulators R, R' are connected to an automatic change-over valve 9, controlled by a pressure switch W. When the gas on one side of the manifold, e. g., that which is stored in the cylinders C and passes through the regulator R, is exhausted or nearly exhausted, and the gas pressure drops, the valve 9 turns off the gas from the regulator R and turns on the gas from the regulator R'. This connects the cylinders C' so they supply the gas. The cylinders C may be removed and replaced with gas filled ones. When the cylinders C' are exhausted, the changeover valve 9 will automatically close off the cylinders C' and connect in the manifold to which the cylinders C are connected. The outlet O below the changeover valve 9 is connected to the torch or other appliances using the gas.

It will be seen that the manifold of Fig. 1 is built up to take eight cylinders C, C', each with its pigtail 7, and check valve 8, and valve V. The manifold itself is made up of nine T's T, one cross X, two elbows E, two regulators, R, R', with nipples N between each of these fittings. All of these must be put together in proper alignment, and each joint must be made perfectly tight, for leakage of high pressure gases is exceedingly dangerous. Assembly and alignment of these manifolds was exceedingly difficult heretofore, and the joints had to be silver soldered or sealed by litharge and glycerine. The present invention makes it possible to make each joint a dry joint, and for an unskilled man to put each joint together with only a wrench. The operation and basic structure of these joints is identical in principle and therefore will be understood by considering one of them in detail, as shown in Figs. 2–6.

The union or joint shown in Fig. 2 is made by putting together, in a manner soon to be explained, three fittings, a nipple N, a bushing B, and a T T having (in this instance) three sockets S, S' and S". Each of these fittings will be briefly discussed and then the method of assembly will be explained.

The T T (Fig. 5) is shown having three identical sockets S, S' and S", so there would be three unions in a finished assembly employing the T T, each union being substantially identical. Instead of being in the T T, the socket S may be in an elbow E, or a collar, pigtail, or valve, and so on. The T body 10 has a through passage 11 and a passage 12 which leads from the inner end 13 of the socket S perpendicularly into the through passage 11. The socket S has interior threads 14 extending (in this instance) from the socket's outer end 15 to a locus near the annular shelf 13 which forms the inner end wall of the socket S. In some fittings, the outer end of the threaded portion 14 may be spaced inwardly from the outer end 15 of the socket itself.

The nipple N (Fig. 4) has a smooth-bored interior passage 20 and at least one (in this case two identical) exteriorly threaded portion 21 which extends from near the end 22 of the nipple to a locus adjacent a shoulder 23 of a smooth cylindrical portion 24 of enlarged exterior diameter. The end portion 22 of the nipple N is shown rounded because this results in a "line contact" when it first comes against the socket shelf 13; on further compression the rounded nipple end 22 will bury or force itself into the shelf 13, deforming the latter with an annular depression (not shown) so that there will be a tight seal even if there had been some unevenness on either part before tightening. For some uses, a flat or wedge-shaped end 22 will be most satisfactory.

The bushing B (Fig. 6) has a bore 30 with an interiorly threaded portion 31 that extends from one end 32 of the bushing to a locus adjacent a shelf 33 where the bore 30 is stepped out radially to a wider cylindrical portion 34 barely larger than the wide diameter nipple portion 24. The shelf 33 serves to abut the shoulder 23 when the bushing B is threaded on the nipple N the proper distance for making the joint, as will be explained later.

The bushing B also has an exteriorly threaded portion 35 which may extend from the end 32 or may be spaced away therefrom to begin at 36, as shown in the drawings. This portion 35 extends to a locus adjacent a shoulder 37, where the bushing B (Fig. 6) has a polygonal head 38 suitable for engagement by a wrench (not shown) when tightening the joint. In the drawings the head 38 is shown as hexagonal although it may be square, octagonal, or another shape. The polygonal shape makes it possible to use a simple end wrench instead of adjustable pipe wrenches which might badly scar such fittings.

It will be noted from the drawings, that the exterior threads 35 of the bushing B and the threads 14 of the socket S have the same pitch, and that their pitch is different from and greater than the pitch of the nipple threads 21 and of the interior threads 31 of the bushing B. Practically any set of ratios may be chosen so long as the exterior threads 35 of the bushing B are of a larger pitch than the inner threads 31, and the difference in pitch is such that the bushing will move along the nipple from the position it occupies in Fig. 1 to the position it occupies in Fig. 2, where the threads 35 are fully engaged in the threads of the T fitting, the end 22 of the nipple forms a leak-tight fit against the wall 13 and the end 32 of the bushing is out of contact with the wall 13. For example, the pitch $P_1$ of the interior threads 31 may be $\frac{1}{20}$ of an inch (20 threads per inch) while the pitch $P_2$ of the exterior threads 35 of the bushing may be $\frac{1}{10}$ of an inch (10 threads per inch). This will give a mechanical advantage of 2 to 1. To obtain a greater mechanical advantage it is only necessary with this invention to make the difference in the pitch of the two threads less. For example, a 4 to 1 advantage would be obtained if the $P_1$ pitch were 20 and the $P_2$ pitch were 15.

The joint is assembled by first threading the bushing B all the way onto the nipple N so that the shelf 33 engages the shoulder 23. This can be done by turning only the bushing B, as the nipple N does not have to be turned. The end 22 of the nipple N will then project out a substantial distance beyond the end 32 of the bushing B (Fig. 2). The bushing B and nipple N may then be inserted in the socket S until the exterior threads 35 engage the socket threads. Then, with the T T and nipple N both held stationary, the bushing B may be threaded into the socket S. As the bushing B is threaded into the socket S, its end 32 moves toward the shelf 13. The end 22 of the nipple N also moves toward the shelf 13, but at a slower rate, due to the differential threading. In other words, relative to the bushing B, the nipple N is moving out of the bushing B but not as fast as its end 22 is being carried into the socket S so that both the nipple N and the bushing B are moving into the socket S. The parts are preferably so proportioned that when the joint is fully completed (Fig. 3) the threads 35 on the bushing B will be fully engaged in the threads 14, the nipple end 22 will barely project beyond the bushing B and will be engaged against the shelf 13, with the bushing end 32 not quite touching the shelf 13. This means that the sealing is accomplished by the fluid-tight fit of the nipple end 22 against the socket shelf 13, and no reliance is made on the tightness of fit of any of the threads to seal the gas in. The gas passes directly from the passage 12 into the bore 20, and is never in the thread area.

It will be evident from the above that there are certain proportions which are optional and other proportions which are essential to the most efficient operation of the invention. These depend principally on the relative pitches $P_1$ and $P_2$. The nipple threaded portion 21 obviously must be longer than the interior threaded portion 31 of the bushing B, so that the nipple end 22 will still project a small amount beyond the bushing end 32 when the joint is complete: the shelf 13 should be engaged by the nipple end 22 and stop the bushing B before its end reaches the shelf 13. It is preferable that the shoulders 23 and 33 be arranged in their respective parts so as to give the nipple end 22 and bushing end 32 the correct spacing when assembled, if before assembly the shoulders 33, 23 are in engagement. This assures the user that the end 32 is not going to reach the shelf 13 and interfere with accomplishment of a seal of the end 22 against the shelf 13. If the end 32 engaged the shelf 13 it would produce an unwanted condition, namely, with the seal being only as effective as the tightness of the threads 21, 31.

These proportions can be summarized mathematically and symbolically, as follows, where:

$P_1$ = the pitch of the interior bushing threads 31 and the nipple threads 21;

$P_2$ = the pitch of the exterior bushing threads 35 and the socket threads 14;

$D$ = the depth of the socket S from the outer end of the threads 14 to the shelf 13;

$L_N$ = the length of the nipple N from its end 22 to the shoulder 23;

$L_B$ = the length from the end 32 of the bushing B to the interior shoulder 33;

$T_B$ = the distance traveled by the bushing end 32 from the initial engagement of its threads 35 with the socket threads 14 to the point where the nipple end 22 engages the shelf 13;

$T_{NB}$ = the distance traveled by the nipple end 22 in relation to the bushing end 32 during the tightening of the joint, from engagement of the bushing threads 35 with the socket threads 14 to the engagement of the nipple end 22 with the shelf 13, the end 32 being out of engagement with the shelf 13;

$T_{NS}$ = the net distance traveled by the nipple end 22 relative to the socket shelf 13, during the tightening of the joint; and $R$ = the number of revolutions or turns required to move the end 22 against the shelf 13 by turning only the bushing B.

Then:

The distance traveled by the bushing B to accomplish the tightening of the joint equals the pitch of the outer bushing threads 35 multiplied by the number of turns, or $$T_B = RP_2$$

Similarly the distance traveled at the same time by the nipple N relative to the bushing B in the opposite direction is expressed as $$T_{NB} = -RP_1$$

which is negative, because in the opposite direction. The net distance traveled by the nipple relative to the socket is, therefore:

$$T_{NS} = RP_2 - RP_1$$

Specific Example 1: For example if $P_1 = \frac{1}{16}''$, $P_2 = \frac{3}{16}''$, and $R = 8$, then $T_B = 1\frac{1}{2}''$, $T_{NB} = -\frac{1}{2}''$, and $T_{NS} = 1''$.

Specific Example 2: If $P_1 = \frac{1}{20}''$, $P_2 = \frac{1}{10}''$, and $R = 7$, then $T_B = \frac{7}{10}''$, $T_{NB} = -\frac{7}{20}''$, and $T_{NS} = \frac{7}{20}''$.

When the nipple N and bushing are fully threaded together, as in Fig. 1, before the joint is made, the nipple end 22 must project beyond the bushing end 32 by an amount greater than $T_{NS}$; so $$L_N - L_B = T_{NS} + k$$

where $k$ is the amount which the nipple end 22 extends beyond the bushing end 32 when the joint is tight. This can also be expressed as $$L_N = L_B + T_{NS} + k$$

Therefore, $$L_N = L_B + RP_2 - RP_1 + k$$

Another set of relationships may be derived as follows:

$$D = T_B = RP_2$$

$$P_1 = \frac{P_1}{P_2} \times P_2$$

$$RP_1 = \frac{P_1}{P_2} \times RP_2$$

$$= \frac{P_1}{P_2} D$$

Therefore:

$$L_N = L_B + D - \frac{P_1}{P_2} + k$$

$$= L_B + D\left(\frac{P_2 - P_1}{P_2}\right) + k$$

Specific Example 3: If $P_1 = \frac{1}{20}''$, $P_2 = \frac{1}{10}''$, $L_B = 1''$, and $D = \frac{13}{16}''$, then $$L_N = 1 + \frac{13}{16}\left(\frac{\frac{1}{10} - \frac{1}{20}}{\frac{1}{20}}\right) + k$$

$$= 1 + \frac{13}{16} \times \frac{1}{2} + k$$

$$= 1\frac{13}{32} + k$$

Specific Example 4: $P_1 = \frac{1}{32}''$, $P_2 = \frac{1}{31}''$, $L_B = 1''$, and $D = \frac{1}{2}''$, then $$L_N = 1 + \frac{1}{2}\left(\frac{\frac{1}{31} - \frac{1}{32}}{\frac{1}{31}}\right) + k$$

$$= 1 + \frac{1}{2} \times \frac{1}{32} + k$$

$$= 1\frac{1}{64} + k$$

From the above, it follows that the critical proportions may readily be worked out. So far as the exterior proportions of the bushing B are concerned, they are not critical, so long as the threads are long enough so that the socket outer end 15 is not struck by the shoulder 37 before the union is completed.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a manifold assembly having a plurality of separate threaded pieces adapted, when joined together, to provide a leak-proof conduit for gases under high pressure, the combination therewith at each joint of a socket member having an interiorly threaded portion, a radially inwardly projecting annular interior shelf having a substantially plane surface disposed at the inner end of the interiorly threaded portion of the socket member; a nipple member having a cylindrical portion, an exteriorly threaded portion extending from at least one end of the nipple member and terminating adjacent the cylindrical portion, a radially outwardly projecting annular exterior shoulder portion formed on the nipple member between the cylindrical and exteriorly threaded portions of said nipple member; and a bushing member having an axially extending bore and a coaxially disposed counter bore of larger diameter than said bore with the portion of juncture between the bore and counter bore defining a radially projecting annular interior abutment, said bore having an interiorly threaded portion extending from one end of the bushing member and terminating adjacent said interior abutment, the outer surface of said bushing member having a polygonal head for engagement by a wrench and an exteriorly threaded portion extending from said head and terminating adjacent said one end of the bushing member, said exteriorly threaded portion of said bushing member having a longitudinal extent less than the longitudinal extent of the interiorly threaded portion of the socket member, said counter bore of the bushing member telescopically receiving that cylindrical portion of the nipple member which forms the shoulder portion, all threads of said threaded portions being of the same hand with the threads of the exteriorly threaded portion of the nipple member matching the threads of the interiorly threaded portion of the bushing member, the threads of the exteriorly threaded portion of the bushing member matching the threads of the interiorly threaded portion of the socket member, said first mentioned matching threads having a larger number of threads per inch than the second mentioned matching threads, the length of said exteriorly threaded portion of said nipple member exceeding the length of the interiorly threaded portion of said bushing member by an amount given by the formula $$L_N = L_B + D\left(\frac{P_2 - P_1}{P_2}\right) + k$$

where $P_1$ is the distance between successive interior threads of the bushing member, $P_2$ is the distance between successive exterior threads of the bushing member, $L_N$ is the distance from said one end of said nipple member to the exterior shoulder portion thereof, $L_B$ is the distance from said one end of said bushing member to the interior abutment thereof, $D$ is the depth of said socket member from the axial outermost interior thread to the interior shelf thereof, and $k$ is a small distance by which the one end of said nipple member projects beyond the one end of said bushing member when said one end of the nipple member abuts said interior shelf of said socket member, whereby, when said bushing member is fully threaded on said nipple member so that said exterior shoulder of the nipple member engages the interior abutment of said bushing member with the cylindrical shoulder forming portion of the nipple member telescopically received within the counter bore of the bushing member, so that the said engagement of the abutment and shoulder acts as a positioning means to properly position the bushing member on the nipple member so that simultaneous relative threaded movement of the bushing member into said socket member and of the bushing member on the nipple member, due to the differential threads between the socket, nipple and bushing members, will cause sealing engagement of the said one end of the nipple member with the interior shelf of the socket member before the said one end of the bushing member engages the interior shelf, said socket and nipple members being restrained against rotational turning movement relative to the bushing member.

2. The structure as set forth in claim 1 wherein said shoulder forming portion of the nipple member supports the polygonal head of the bushing member at all times during the simultaneous relative threaded movement of the bushing member into the socket member and on the nipple member and thus prevents the polygonal head of the bushing member from collapsing.

References Cited in the file of this patent

UNITED STATES PATENTS

| | | |
|---|---|---|
| 193,877 | Lawler | Aug. 7, 1877 |
| 503,433 | McIntyre | Aug. 15, 1893 |
| 558,685 | Haythorn | Apr. 21, 1896 |
| 1,002,467 | Stelck | Sept. 5, 1911 |

FOREIGN PATENTS

| | | |
|---|---|---|
| 5,302 | Great Britain | Mar. 3, 1904 |
| 682,230 | France | Feb. 11, 1930 |
| 706,772 | France | Mar. 31, 1931 |